United States Patent [19]
Campbell et al.

[11] 3,862,095
[45] Jan. 21, 1975

[54] ARYLENE SULFIDE POLYMERS
[75] Inventors: Robert W. Campbell; Charles W. Moberly, both of Bartlesville, Okla.
[73] Assignee: Phillips Petroleum Company, Bartlesville, Okla.
[22] Filed: Nov. 19, 1973
[21] Appl. No.: 416,779

[52] U.S. Cl. ................................. 260/79.1, 260/79
[51] Int. Cl. ............................................ C08g 23/00
[58] Field of Search ............................. 260/79, 79.1

[56] References Cited
UNITED STATES PATENTS
3,538,166    11/1970    Campbell ........................ 260/609 E

*Primary Examiner*—Melvyn I. Marquis

[57] ABSTRACT

A method of producing arylene sulfide polymers employing (1) polyhalo-substituted aromatic compounds; (2) thioureas; (3) bases selected from the hydroxides of lithium, sodium, potassium, rubidium, cesium, magnesium, calcium, strontium and barium and the carbonates of sodium, potassium, rubidium and cesium; and, (4) organic amides.

18 Claims, No Drawings

ARYLENE SULFIDE POLYMERS

This invention pertains to the producing of arylene sulfide polymers.

In one of its more specific aspects, this invention pertains to a novel method of producing polymers such as those produced by the method of U.S. Pat. No. 3,354,129.

In U.S. Pat. No. 3,354,129, the disclosure of which is incorporated herein by reference, there is disclosed a method of producing polymers from polyhalo-substituted aromatics, alkali metal sulfides and polar organic compounds. There has now been discovered another method of preparing arylene sulfide polymers.

In accordance with one embodiment of the present invention, arylene sulfide polymers are produced by reacting at least one polyhalo-substituted aromatic compound with a mixture in which at least one thiourea, at least one base and at least one organic amide are contacted.

The polyhalo-substituted aromatic compounds which can be employed in the method of this invention are compounds in which the halogen atoms are attached to aromatic ring carbon atoms. Suitable compounds include 1,2-dichlorobenzene, 1,3-dichlorobenzene, 1,4-dichlorobenzene and the other polyhalo-substituted aromatic compounds described and exemplified in the aforementioned U.S. Pat. No. 3,354,129. Mixtures of polyhalo-substituted aromatic compounds such as dihalobenzenes can be used, for example, a mixture comprising at least one m-dihalobenzene and at least one p-dihalobenzene.

Thioureas which can be used in this invention can be represented by the formula

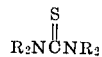

wherein R is selected from the group consisting of hydrogen and alkyl, cycloalkyl, and aryl radicals and combinations thereof such as alkaryl, aralkyl and the like, the number of carbon atoms in each R group being within the range of 0 to about 12. Examples of some thioureas which can be employed include unsubstituted thiourea, 1-methyl-2-thiourea, 1,3-dimethyl-2-thiourea, 1,1,3,3-tetramethyl-2-thiourea, 1,3-diethyl-2-thiourea, 1,1,3,3-tetraethyl-2-thiourea, 1,3-diisopropyl-1-butyl-2-thiourea, 1-hexyl-3-phenyl-2-thiourea, 1-(3-ethylhexyl)-1-decyl-3-cyclohexyl-2-thiourea, 1,1,3,3-tetradodecyl-2-thiourea, 1,1-dibenzyl-2-thiourea, 1-p-tolyl-2-thiourea, 1-(2-methylcyclopentyl)-3-(cyclohexylmethyl)-2-thiourea and the like, and mixtures thereof.

Bases which can be used in the method of the present invention include the hydroxides of lithium, sodium, potassium, rubidium, cesium, magnesium, calcium, strontium and barium and the carbonates of sodium, potassium, rubidium and cesium. If desired, the hydroxide can be produced in situ by the reaction of the corresponding oxide with water.

The organic amides which can be used in this invention should be substantially liquid at the reaction temperatures and pressures employed. The amides can be cyclic or acyclic and can have 1 to about 10 carbon atoms per molecule. Examples of some suitable amides include formamide, acetamide, N-methylformamide, N,N-dimethylformamide, N,N-dimethylacetamide, N-ethylpropionamide, N,N-dipropylbutyramide, 2-pyrrolidone, N-methyl-2-pyrrolidone, ε-caprolactam, N-methyl-ε-caprolactam, N,N'-ethylenedi-2-pyrrolidone, hexamethylphosphoramide, tetramethylurea, and the like and mixtures thereof.

The components used in the preparation of the arylene sulfide polymer can be introduced into contact in any order. Water which can be present in any composite formed from any of the preceding compounds, for example, the composite formed from the polyhalo-substituted aromatic compound, the thiourea, the base and the organic amide or which can be present in a composite formed from the thiourea, the base and the organic amide can be removed, for example, by distillation, prior to conducting the polymerization reaction. Such water can be present as an impurity, as a solvent or diluent or as water of hydration. Regardless of whether a water removal step is employed, at least a portion of the composition formed from the polyhalo-substituted aromatic compound, the thiourea, the base and the organic amide is maintained at polymerization conditions to produce the arylene sulfide polymer.

The ratio of reactants can vary considerably but the gram-mole ratio of polyhalo-substituted aromatic compound to thiourea generally will be within the range of from about 0.9 to 1 to about 2 to 1, and preferably about 0.95 to 1 to about 1.2 to 1. The base generally will be employed in an amount within the range of from about 1 to about 6, and preferably from about 2 to about 5, gram-equivalents per gram-mole of thiourea. As used herein, one gram-equivalent of the hydroxides of magnesium, calcium, strontium and barium represents the same amount as one-half gram-mole of these substances, whereas for the hydroxides of lithium, sodium, potassium rubidium and cesium, or for the carbonates of sodium, potassium, rubidium and cesium, the amount represented by one gram-equivalent is considered to be the same as that represented by one gram-mole. The amount of the amide can vary over a wide range, generally being within the range of from about 100 grams to about 2,500 grams per gram-mole of polyhalo-substituted aromatic compound employed.

Although the temperature at which the polymerization process is conducted can vary over a wide range, the temperature will generally be within the range of from about 125° C. to about 450° C. and, preferably, within the range of from about 175° C. to about 350° C. Correspondingly, the reaction time will generally be within the range of from about 10 minutes to about 3 days and, preferably, from about 1 hour to about 8 hours. The pressure need be only sufficient to maintain the polyhalo-substituted aromatic compound and the organic amide substantially in the liquid phase and to retain the sulfur source therein.

The arylene sulfide polymers produced by the method of this invention can be separated from the reaction mixture by conventional procedures, e.g., by filtration of the polymer followed by washing with water, or by dilution of the reaction mixture with water, followed by filtration and water-washing of the polymer.

The arylene sulfide polymers prepared by the method of this invention can be blended with substances such as fillers, pigments, stabilizers, softeners, extenders, tackifiers, other polymers, and the like to produce molded objects, surface coatings, films and the like.

The arylene sulfide polymers produced by the method of this invention can be readily cured through cross-linking and/or chain extension, e.g., by heating at a temperature within the range of from about 260° C. to about 480° C. for about 5 minutes to about 20 hours, preferably in the presence of air or other free oxygen-containing gas to provide cured products having high thermal stability and good chemical resistance.

Arylene sulfide polymers are particularly useful in the production of coatings, films, molded objects and fibers.

The previous statements are based upon the following examples.

In the following Examples, which illustrate the best mode for carrying out the invention, values for inherent viscosities were determined at 206° C. in 1-chloronaphthalene at a polymer concentration of 0.4 g per 100 ml. solution. Values shown for glass transition temperature and crystalline melting point were determined by differential thermal analysis.

EXAMPLE I

To a stirred reactor were charged 76.1 g (1.0 mole) of thiourea, 80 g (2.0 moles) of sodium hydroxide and 276.7 g of N-methyl-2-pyrrolidone. The mixture was closed off under 10 psig nitrogen and heated to 175° C. in 1½ hours. The pressure reached 380 psig.

The mixture was cooled to 75° C., vented to 25 psig and a solution of 149.9 g (1.02 moles) of p-dichlorobenzene in 50 g of N-methyl-2-pyrrolidone was charged. The mixture was heated to 245° C. in 1½ hours and maintained at this temperature for 2 hours, the pressure being within the range of 180 to 240 psig.

After cooling to room temperature, the dark product was washed with four 1-liter portions of hot water and dried in a vacuum oven at 80° C.

There was recovered 44.7 g of poly(p-phenylene sulfide) representing a yield of 41%.

The product had an inherent viscosity of 0.01, a glass transition temperature of 41° C. and a crystalline melting point of 260° C.

This example indicates the operability of the invention employing thiourea.

EXAMPLE II

To a stirred reactor thiourea, sodium hydroxide and N-methyl-2-pyrrolidone were charged in the quantities set out in Example I.

While nitrogen was held through the system, the temperature was increased to 200° C. in 2 hours, 20 minutes.

Distillate was collected (28 ml) which contained 17.6 g of water.

The reaction mixture was cooled to 175° C. and a solution of 149.9 g (1.02 moles) p-dichlorobenzene in 50 g of N-methyl-2-pyrrolidone was added. The system was closed off under 20 psig N₂ and heated to 245° C. for 3 hours during which time the pressure was between 75 and 95 psig.

The reaction mixture was cooled to room temperature and the brown product was washed with four 1-liter portions of hot water and with three 1-liter portions of methanol. The washed product was dried in a vacuum oven at 80° C. There was recovered 72.5 g of poly(p-phenylene sulfide) representing a yield of 67%.

The product had an inherent viscosity of 0.07, a glass transition temperature of 47° C. and a crystalline melting point of 278° C.

This example indicates the step of water removal which can be carried out during the process of the invention.

EXAMPLE III

The following runs indicate the employment of substituted thioureas in the method of the invention, the substituted thioureas being 1,3-diethyl-2-thiourea in Run No. IIIa and 1,1,3,3-tetramethyl-2-thiourea in Run No. IIIb.

In each of Run IIIa and IIIb, the quantities shown of N-methyl-2-pyrrolidone, sodium hydroxide and the substituted thiourea were charged to the reactor and the resulting mixture flushed with nitrogen. The reactor was heated to 196° C. or above while flushing with nitrogen, and water was distilled from the mixture.

To each of the resulting mixtures, p-dichlorobenzene and N-methyl-2-pyrrolidone were added. With the reactor at about 5 psig, the temperature was raised to 246° C. and the mixture was maintained at this temperature for three hours. After cooling, the product was removed from the reactor, washed with four portions of hot water, being filtered between washes. The product was dried in a vacuum oven about 16 hours at 100° C.

The charge, yield and properties of the product are as indicated below:

| Run No. | IIIa | IIIb |
|---|---|---|
| Charge, grams (moles) | | |
| N-methyl-2-pyrrolidone (a) | 275 | 275 |
| Sodium hydroxide (98%) | 163.1 (4.0) | 61.1 (1.5) |
| 1,3-diethyl-2-thiourea | 132.2 (1.00) | — |
| 1,1,3,3-tetramethyl-2-thiourea | — | 49.5 (0.374) |
| p-dichlorobenzene | 151.9 (1.03) | 56.9 (0.387) |
| N-methyl-2-pyrrolidone (b) | 52.0 | 52.0 |
| Product [poly(p-phenylene sulfide)] | | |
| Yield | | |
| Grams | 94.5 | 37.9 |
| Percent | 88 | 94 |
| Properties | | |
| Inherent viscosity | 0.04 | 0.07 |
| Crystalline melting point | 249° C. | 273° C. |
| Ash, wgt. percent | 1.1 | 1.5 |
| (a) Charged initially. | | |
| (b) Charged with p-dichlorobenzene. | | |

EXAMPLE IV

The following Runs IVa and IVb show additional conditions under which an arylene sulfide polymer was produced.

Runs IVa and IVb, tabulated below, were made in the manner of Runs IIIa and IIIb of Example III.

| Run No. | IVa | IVb |
| --- | --- | --- |
| Charge, grams (moles) | | |
| N-methyl-2-pyrrolidone (a) | 275 | 275 |
| Sodium hydroxide (98%) | 81.8 (2.0) | 163.1 (4.0) |
| 1,3-diethyl-2-thiourea | 132.2 (1.00) | — |
| Thiourea | — | 76.1 (1.00) |
| p-dichlorobenzene | 151.9 (1.03) | 151.9 (1.03) |
| N-methyl-2-pyrrolidone (b) | 52 | 52 |
| Product [poly(p-phenylene sulfide)] | | |
| Yield | | |
| Grams | 18.3 | 101.0 |
| Percent | 17.0 | 93 |
| Properties | | |
| Inherent viscosity | 0.02 | 0.14 |
| Ash, percent | — | 0.99 |

(a) Charged initially.
(b) Charged with p-dichlorobenzene.

Comparison of the foregoing with Examples II and III (Run IIIa) indicates that the employment of an increased proportion of sodium hydroxide in relation to unsubstituted or substituted thiourea resulted in an increase in yield of poly(p-phenylene sulfide).

It will be evident from the foregoing that various modifications can be made to the method of this invention. Such, however, are considered as being within the scope of the invention.

What is claimed is:

1. A method of producing a polymer which comprises:
    a. forming a composition by contacting at least one polyhalo-substituted aromatic compound wherein the halogen atoms are attached to aromatic ring carbon atoms, at least one base selected from the hydroxides of lithium, sodium, potassium, rubidium, cesium, magnesium, calcium, strontium and barium and the carbonates of sodium, potassium, rubidium and cesium, at least one organic amide and at least one thiourea having the formula

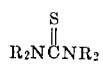

wherein R is selected from the group consisting of hydrogen and alkyl, cycloalkyl and aryl radicals or combinations of said radicals, the number of carbon atoms in each R group being within the range of 0 to about 12; and,
    b. maintaining at least a portion of said composition at polymerization conditions to produce said polymer.

2. The method of claim 1 in which said thiourea is selected from the group consisting of thiourea, 1-methyl-2-thiourea, 1,3-dimethyl-2-thiourea, 1,1,3,3-tetramethyl-2-thiourea, 1,3-diethyl-2-thiourea, 1,1,3,3-tetraethyl-2-thiourea, 1,3-diisopropyl-1-butyl-2-thiourea, 1-hexyl-3-phenyl-2-thiourea, 1-(3-ethylhexyl)-1-decyl-3-cyclohexyl-2-thiourea, 1,1,3,3-tetradodecyl-2-thiourea, 1,1-dibenzyl-2-thiourea, 1-p-tolyl-2-thiourea, and 1-(2-methylcyclopentyl)-3-(cyclohexylmethyl)-2-thiourea.

3. The method of claim 1 in which said polyhalo-substituted aromatic compound is employed in an amount within the range of from about 0.9 to about 2 gram-moles per gram-mole of thiourea.

4. The method of claim 1 in which said base is employed in an amount within the range of from about 1 to about 6 gram-equivalents per gram-mole of thiourea.

5. The method of claim 1 in which said organic amide is employed in an amount within the range of from about 100 grams to about 2,500 grams per gram-mole of polyhalo-substituted aromatic compound.

6. The method of claim 1 in which said polyhalo-substituted aromatic compound is p-dichlorobenzene, said base is sodium hydroxide, said thiourea is selected from the group consisting of unsubstituted thiourea, 1,1,3,3-tetramethyl-2-thiourea and 1,3-diethyl-2-thiourea and said organic amide is N-methyl-2-pyrrolidone.

7. The method of claim 1 in which said thiourea is 1,3-diethyl-2-thiourea.

8. The method of claim 1 in which water is removed from said composition prior to maintaining said composition at polymerization conditions.

9. The method of producing a polymer which comprises:
    a. contacting at least one base, at least one organic amide and at least one thiourea to form a first composition, said thiourea having the formula

wherein R is selected from the group consisting of hydrogen and alkyl, cycloalkyl and aryl radicals or combinations of said radicals, the number of carbon atoms in each R group being within the range of 0 to about 12, said base being selected from the hydroxides of lithium, sodium, potassium, rubidium, cesium, magnesium, calcium, strontium and barium and the carbonates of sodium, potassium, rubidium and cesium;
    b. contacting at least a portion of said first composition with at least one polyhalo-substituted aromatic compound wherein the halogen atoms are attached to aromatic ring carbon atoms to form a second composition; and,
    c. maintaining said second composition at polymerization conditions to form said polymer.

10. The method of claim 9 in which said thiourea is selected from the group consisting of thiourea, 1-methyl-2-thiourea, 1,3-dimethyl-2-thiourea, 1,1,3,3-tetramethyl-2-thiourea, 1,3-diethyl-2-thiourea, 1,1,3,3-tetraethyl-2-thiourea, 1,3-diisopropyl-1-butyl-2-thiourea, 1-hexyl-3-phenyl-2-thiourea, 1-(3-ethylhexyl)-1-decyl-3-cyclohexyl-2-thiourea, 1,1,3,3-tetradodecyl-2-thiourea, 1,1,-dibenzyl-2-thiourea, 1-p-tolyl-2-thiourea, and 1-(2-methylcyclopentyl)-3-(cyclohexylmethyl)-2-thiourea.

11. The method of claim 9 in which said polyhalo-substituted aromatic compound is employed in an amount within the range of from about 0.9 to about 2 gram-moles per gram-mole of thiourea.

12. The method of claim 9 in which said base is employed in an amount within the range of from about 1 to about 6 gram-equivalents per gram-mole of thiourea.

13. The method of claim 9 in which said organic amide is employed in an amount within the range of from about 100 grams to about 2,500 grams per gram-mole of polyhalo-substituted aromatic compound.

14. The method of claim 9 in which said polyhalo-substituted aromatic compound is p-dichlorobenzene, said base is sodium hydroxide, said thiourea is selected from the group consisting of unsubstituted thiourea, 1,1,3,3-tetramethyl-2-thiourea and 1,3-diethyl-2-thiourea and said organic amide is N-methyl-2-pyrrolidone.

15. The method of claim 9 in which said thiourea is 1,3-diethyl-2-thiourea.

16. The method of claim 9 in which water is removed from said first composition prior to maintaining said second composition at polymerization conditions.

17. The method of claim 1 in which said thiourea is 1,1,3,3-tetramethyl-2-thiourea.

18. The method of claim 9 in which said thiourea is 1,1,3,3-tetramethyl-2-thiourea.

* * * * *